(12) United States Patent
Snyder

(10) Patent No.: US 6,557,805 B1
(45) Date of Patent: May 6, 2003

(54) DEVICE FOR SUPPORTING DUCTS

(76) Inventor: Darryl L. Snyder, 4520 N. Market St., Canton, OH (US) 44714

( * ) Notice: Subject to any disclaimer, the term of this patent is extended or adjusted under 35 U.S.C. 154(b) by 0 days.

(21) Appl. No.: 09/717,581

(22) Filed: Nov. 21, 2000

Related U.S. Application Data (63) Continuation-in-part of application No. 09/197,549, filed on Nov. 23, 1998, now Pat. No. 6,202,962.

(51) Int. Cl.[7] .................................................. F16L 3/137
(52) U.S. Cl. .................................................. 248/60; 248/75
(58) Field of Search ........................... 248/59, 60, 73, 248/72, 317, 323, 327, 74.3, 75; D8/380

(56) References Cited

U.S. PATENT DOCUMENTS

| | | | | |
|---|---|---|---|---|
| 505,209 A | | 9/1893 | White .................. 248/217.2 |
| 796,178 A | | 8/1905 | Beaton .................. 248/57 |
| 806,192 A | | 12/1905 | Russell .................. 248/59 |
| 1,086,442 A | | 2/1914 | Cornelius .................. 248/59 |
| 1,261,036 A | | 4/1918 | Kerns .................. 248/27 |
| 1,362,244 A | * | 12/1920 | Farley .................. 248/59 |
| 1,450,640 A | * | 4/1923 | Norman .................. 248/59 |
| 1,463,298 A | * | 7/1923 | Spicer .................. 220/567.3 |
| 1,515,216 A | | 11/1924 | Kissinger .................. 248/219.4 |
| 2,161,782 A | * | 6/1939 | Flower .................. 248/59 |
| 2,319,832 A | * | 5/1943 | Trochim .................. 248/60 |
| 2,423,455 A | | 7/1947 | Larson .................. 248/71 |
| 2,707,607 A | | 5/1955 | O'Connor .................. 248/60 |
| 2,788,188 A | | 4/1957 | Smith et al. .................. 248/57 |
| 2,809,002 A | | 10/1957 | Rudolph .................. 248/205 |
| 2,917,263 A | | 12/1959 | Appleton et al. ............ 248/216 |
| 3,104,087 A | | 9/1963 | Budnick et al. ............ 248/343 |
| 3,162,413 A | | 12/1964 | Hexdall .................. 248/71 |
| 3,163,386 A | | 12/1964 | Collins .................. 248/71 |
| 3,189,682 A | | 6/1965 | Irish .................. 174/165 |
| 3,224,054 A | | 12/1965 | Lige .................. 24/16 |
| 3,285,553 A | | 11/1966 | Hexdall .................. 248/71 |
| 3,598,013 A | * | 8/1971 | Broberg .................. 411/79 |
| 3,896,799 A | * | 7/1975 | Seeley .................. 128/877 |
| 3,941,412 A | * | 3/1976 | Carpenter .................. 294/74 |
| 3,979,094 A | | 9/1976 | DeWitt .................. 248/60 |
| 4,057,210 A | * | 11/1977 | Wellman .................. 248/318 |
| 4,266,745 A | * | 5/1981 | Jones .................. 248/58 |
| 4,334,569 A | * | 6/1982 | Jacob et al. .................. 152/218 |
| 4,472,838 A | * | 9/1984 | Pompa .................. 2/460 |
| 4,606,460 A | * | 8/1986 | Luray .................. 206/583 |
| 4,618,114 A | | 10/1986 | McFarland .................. 248/65 |
| 4,638,966 A | * | 1/1987 | Ford .................. 248/62 |
| 4,717,099 A | | 1/1988 | Hubbard .................. 248/57 |
| 4,852,831 A | * | 8/1989 | Sandstrom .................. 248/58 |
| D307,541 S | * | 5/1990 | Tres .................. D8/396 |
| 5,005,789 A | * | 4/1991 | Jones .................. 248/58 |
| 5,230,488 A | * | 7/1993 | Condon .................. 248/73 |
| 5,339,577 A | * | 8/1994 | Snyder .................. 52/95 |
| 5,522,571 A | * | 6/1996 | Simmons .................. 248/59 |
| 5,692,268 A | * | 12/1997 | Case .................. 224/420 |
| 6,073,315 A | | 6/2000 | Rasmussen .................. 24/16 PB |
| 6,152,412 A | * | 11/2000 | Basickes et al. ............ 248/317 |

* cited by examiner

Primary Examiner—Ramon O. Ramirez
Assistant Examiner—Jon Szumny
(74) Attorney, Agent, or Firm—Sand & Sebolt (57) ABSTRACT

A device for supporting ducts includes a strap that may be adjustably connected to a support. A cradle is carried by the strap. The cradle is adapted to rest against a flexible duct to prevent the duct from buckling over the strap. The cradle is slidably adjusted on the strap. A buckle may be provided to allow the strap to be looped over a support. Two cradles may be slidably mounted on a single strap when a larger diameter duct is supported by the device.

7 Claims, 13 Drawing Sheets

DEVICE FOR SUPPORTING DUCTS

CROSS-REFERENCE TO RELATED APPLICATION

This application is a continuation-in-part application of U.S. application Ser. No. 09/197,549 filed Nov. 23, 1998 now U.S. Pat. No. 6,202,962; the disclosures of which are incorporated herein by reference.

BACKGROUND OF THE INVENTION

1. Field of the Invention

The present invention generally relates to a device used to support ducts and particularly heating and cooling ducts. More specifically, the present invention relates to a flexible support system used to support flexible heating and cooling ducts without pinching the ducts.

2. Description of Related Art

Conventional heating and cooling ducts are mounted between floor and ceiling joists in fixed permanent relation. The ducts are commonly restrained by wires or metal straps that are connected to juxtaposed wooden joists or studs of a building structure. Nails or screws are driven into the joists in facing relationship at spaced-apart locations and the wires or metal straps are connected thereto after being wrapped around the ducts to permanently support the same. Frequently, the supporting wires or straps must be released and readjusted in their supporting relationships to realign the ducts, especially when lengthy runs of the ducts may be misaligned. Such relocation of the wires or metal straps is not easily achieved where the wires or straps must be removed from the supporting nails or screws. This may occur in more than one supporting location and often in multiple supporting spaced-apart locations, which is very time consuming and troublesome to properly complete a given construction job.

New heating and cooling ducts are often flexible round ducts that have insulated walls. The typical mounting arrangement uses wires to suspend the ducts from ceiling rafters. The installers prefer to use a few spaced supports. This arrangement often causes the flexible duct to pinch or buckle. Such pinching or buckling can prevent air from passing through the duct or substantially reduce the air passing through the duct.

BRIEF SUMMARY OF THE INVENTION

The present invention provides a device that supports ducts. The device includes a flexible strap that carries a cradle. The flexible strap may be quickly and easily connected in an adjustable manner to a support such as a ceiling or floor joist. The cradle is adjustable carried by the strap and spreads the supporting force over a wide area of the strap to prevent the duct from buckling.

The invention also provides a device that may be looped over a support and connected to itself to provide a support for a duct. A locking buckle is provided on the strap to connect the strap book to itself in an adjustable manner.

BRIEF DESCRIPTION OF THE SEVERAL VIEWS OF THE DRAWINGS

Similar numbers refer to similar parts throughout the specification.

DETAILED DESCRIPTION OF THE INVENTION

Figure 1:
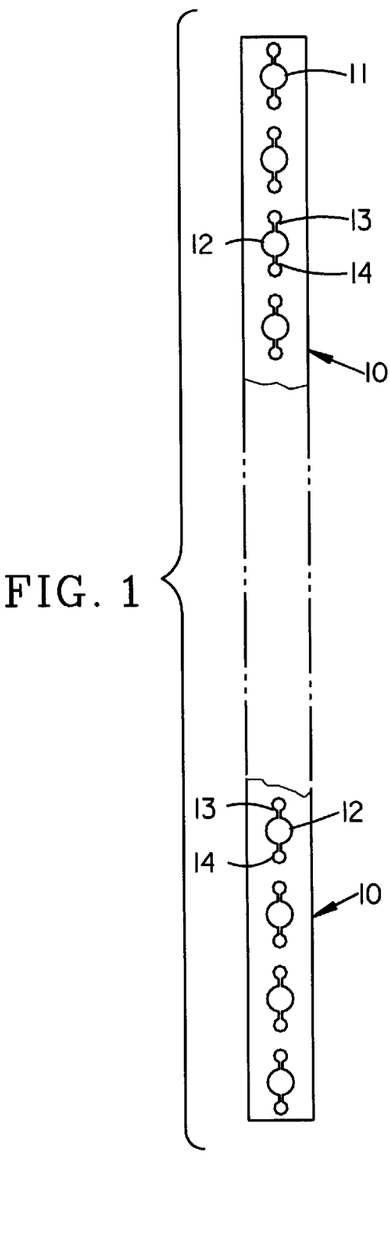
FIG. 1 is a top plan view of the strap of the present invention.

With reference to FIG. 1 of the drawings, the subject strap 10 is comprised of flexible plastic material such as high-density polyethylene or polypropylene having a width of about 1 inch and a thickness of about ⅛ inch. The strap 10 has a repetitive series of grouped multiple apertures 11 extending throughout its length in uniform closely-spaced alignment. The grouped apertures are located on the center-line of the strap. The repeated groups 11 of apertures are each comprised of one large aperture 12 and two smaller apertures 13 and 14 on each side of the larger, the smaller apertures being of the same size. The larger aperture 12 is circular in shape having a diameter ranging from about ¼ to ⅜ inch. The smaller apertures have a similar uniform circular diameter ranging from about ⅛ to ³⁄₁₆ inch. The smaller apertures 13 and 14 are located in lineal alignment with the larger aperture 12 and formed closely adjacent thereto.

The plural groups 11 of multiple apertures each have a line of severance connecting the single large aperture and the two smaller apertures. The said repeated groups 11 of apertures extend throughout the full length of the strap located on about 1 inch centers. The grouped apertures permit widely varying use of the strap for supporting all types of conventionally-formed shapes of heating and cooling ducts such as those having round, oval and rectangular cross-sectional shapes. Such shapes are all used in residential and commercial building construction and vary in size and shape depending on the building requirements.

The strap can be pulled downwardly after initial partial seating of the nail or screw to place the nail head and larger aperture in centered alignment for readjustment of the strap on the nail. The strap can then be removed from the nail and its position readjusted with the nail pulled upwardly or downwardly for final seating of the nail and strap with the duct in proper permanent alignment. The strap has the further advantage of being moved to its proper location with the nail shank surrounding the smaller aperture as desired. This is particularly important where the nail or screw cannot be removed or relocated due to space limitations around the duct once installed in temporary or permanent location.

Figure 2:
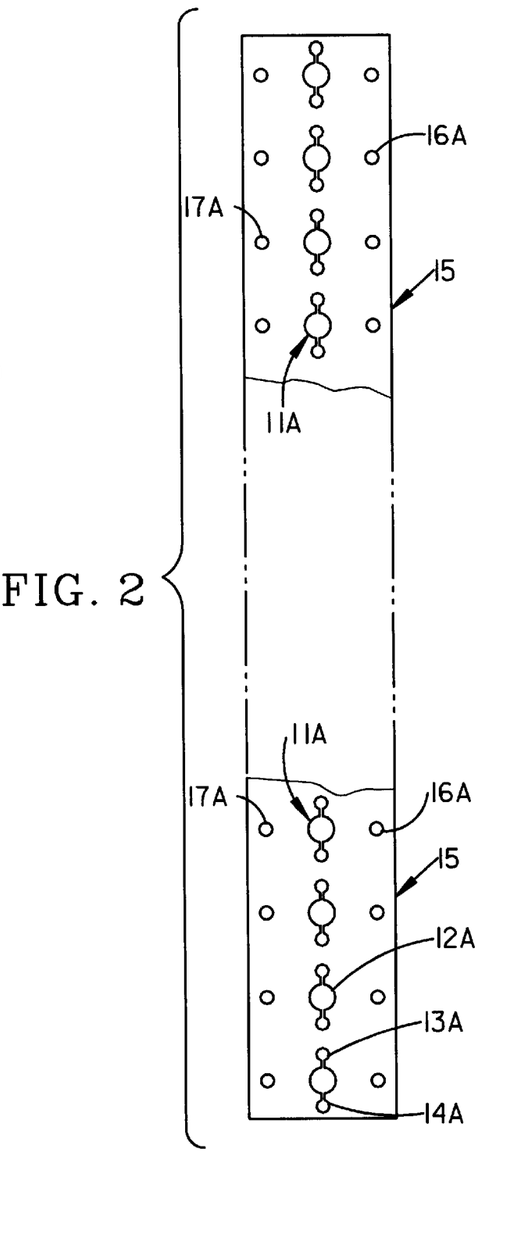
FIG. 2 is a top plan view of another strap having a broader width with side openings near its edges.

FIG. 2 shows another modification of the strap designated by the numeral 15 having a wider width than the strap 10 and repeated groups 11a of multiple apertures as aforesaid. The strap 15 has a width varying from about 1½ to 2 inches. The strap edges have a series of spaced-apart parallel apertures or small holes 16a and 16b extending along both edges throughout the full length of the strap. The side apertures can be used to fasten the strap in place using nails or staples as desired or required.

The strap 15 has a series of grouped apertures 11a in a central lineal region similar to those apertures 11 shown and described in FIG. 1 with respect to strap 10. The repeated groups are preferably located on about 1 inch centers. Each group consists of one large aperture 12a and two smaller similar apertures 13a and 14a located on each side of the larger aperture in closely-spaced arrangement. The grouped apertures each have a lineal line of severance connecting each of the grouped apertures for passage of shank portions of nails or screws between the apertures.

Figure 3:
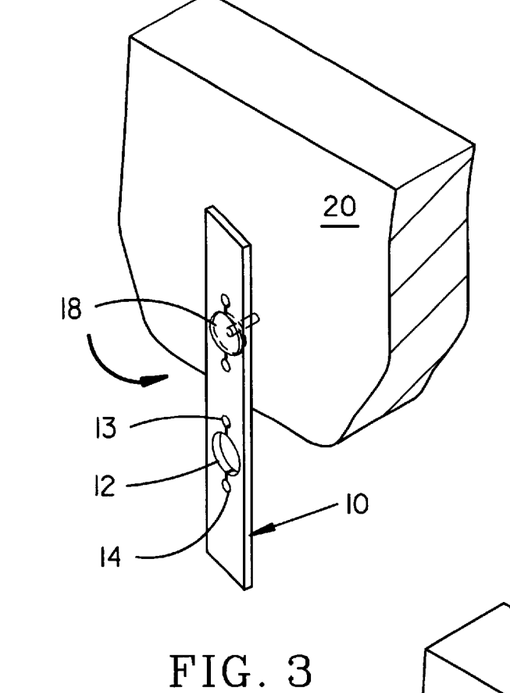
FIG. 3 is a perspective view of one end of the strap of FIG. 1 being attached to a wooden floor joist with a nail.
Figure 4:
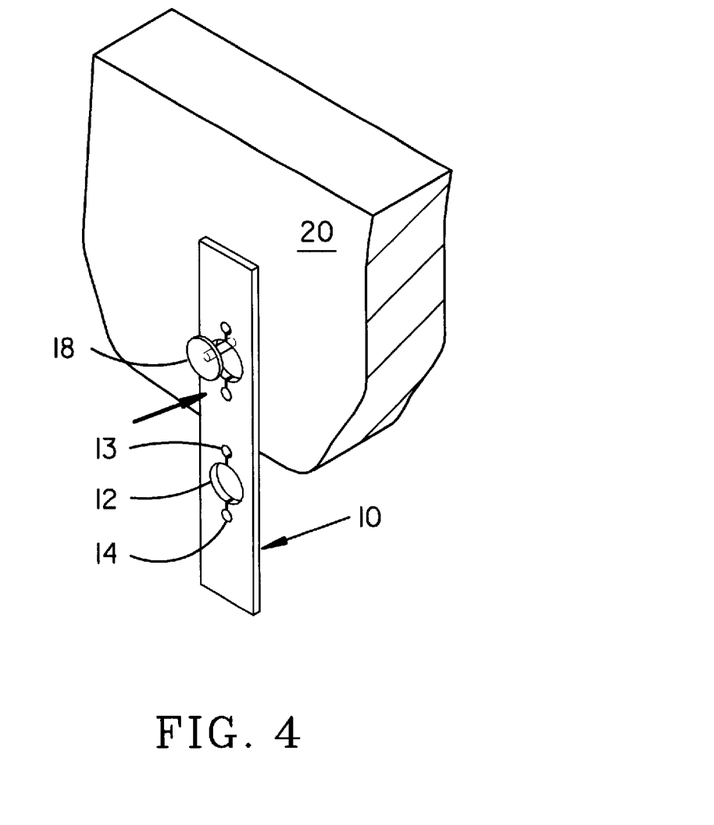
FIG. 4 is another perspective view of the strap end being attached to the wooden floor joist.
Figure 5:
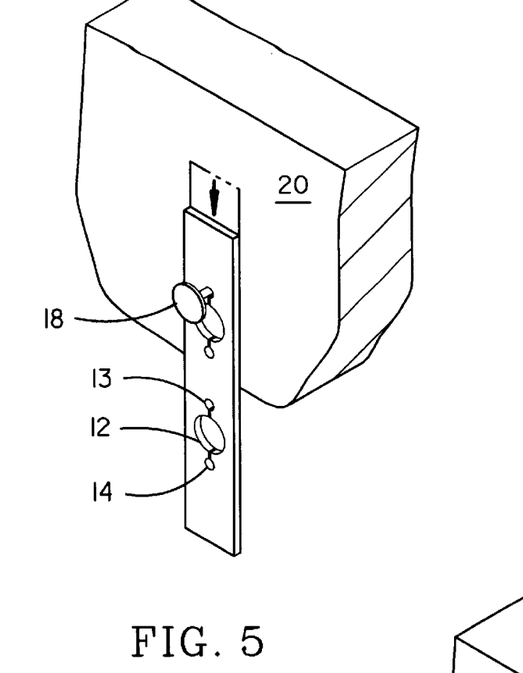
FIG. 5 is another perspective view of the strap end being adjusted downwardly for its attachment by the nail initially started in FIG. 4.
Figure 6:
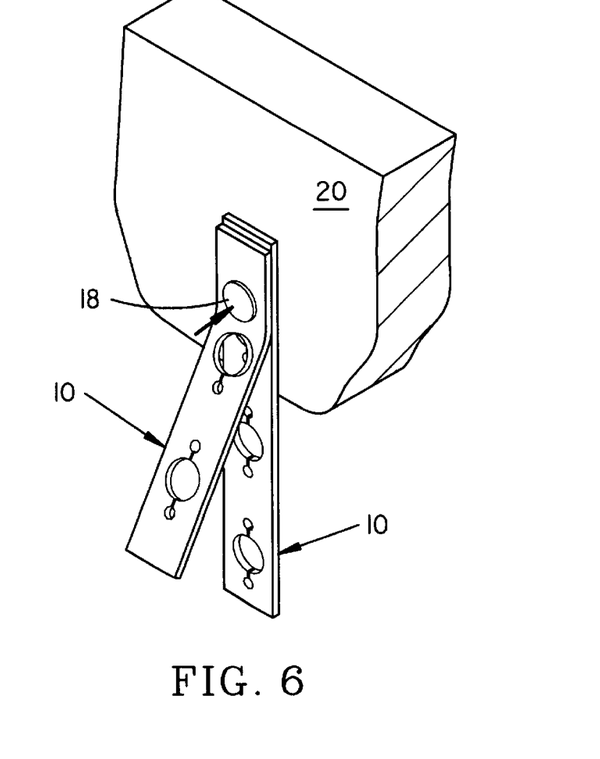
FIG. 6 is another perspective view of both ends of the being fully seated and retained by a single nail engaging both ends of the strap.

FIGS. 3 and 4 both show how large-headed nails 18 may be driven through the strap apertures into wooden floor joists 20. The nails 18 may be only partially driven into the joists 20 to initially support the ducts, and then be finally seated in the joists after their alignment with the smaller apertures as shown in FIGS. 5 and 6. If the duct is found to be improperly supported by the strap, or not in correctly aligned relation with other portions of the duct, the strap end where connected to the nail or screw may be moved so that the head portion of the nail 18 is in alignment with the larger aperture 12. The strap can be easily pulled off the nail with the head portion 18a passing through the larger aperture 12. The strap end and the supported duct can then be realigned to place the nail and strap into proper seating relationship. Thus, the nail can be retained in place and the strap readjusted to place the duct into proper desired realignment. As aforesaid, the strap can be pulled downwardly to place the nail head in alignment with one of the small apertures for final seating of the nail or screw for permanent support of the duct. The strap has the advantage of its both temporary and permanent support of the duct without removal of the nail or screw which may or may not be easily achieved.

Figure 7:
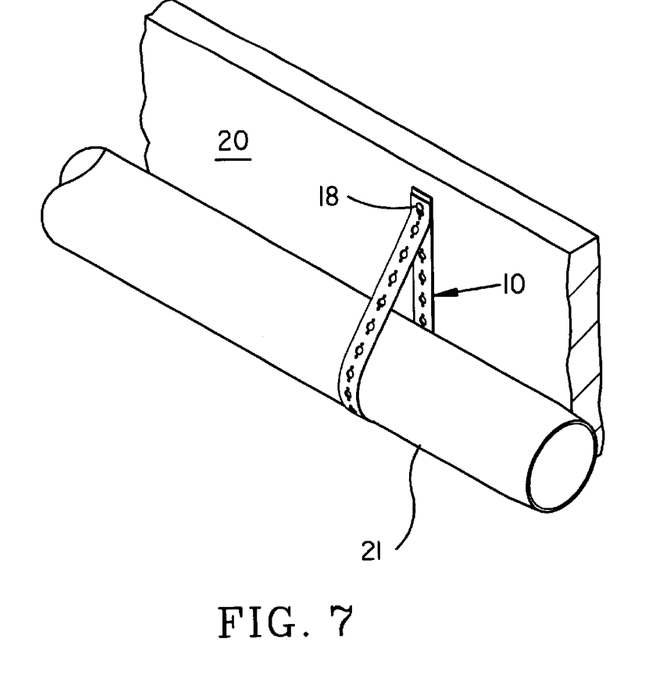
FIG. 7 is a perspective view of an air-flow duct retained by the strap ends using a single nail attached to a floor joist.
Figure 8:
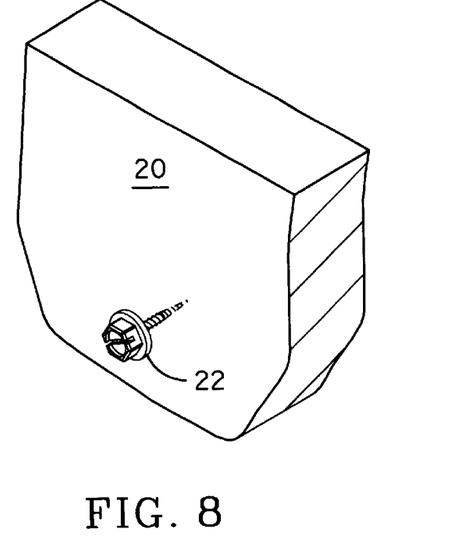
FIG. 8 is a perspective view of a metal screw attached to a floor joist for securing the strap end.
Figure 9:
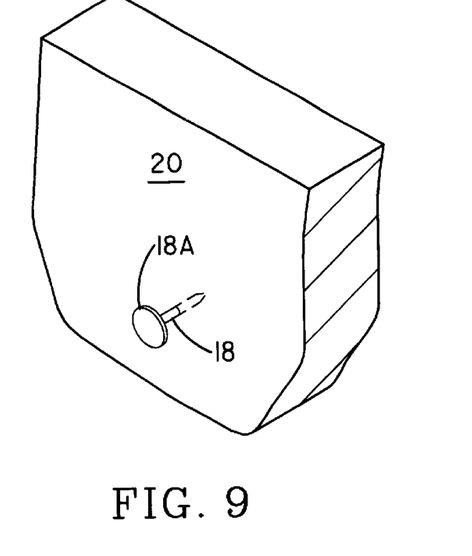
FIG. 9 is a perspective view similar to FIG. 8 of a nail having a large head for securing the strap end.
Figure 10:
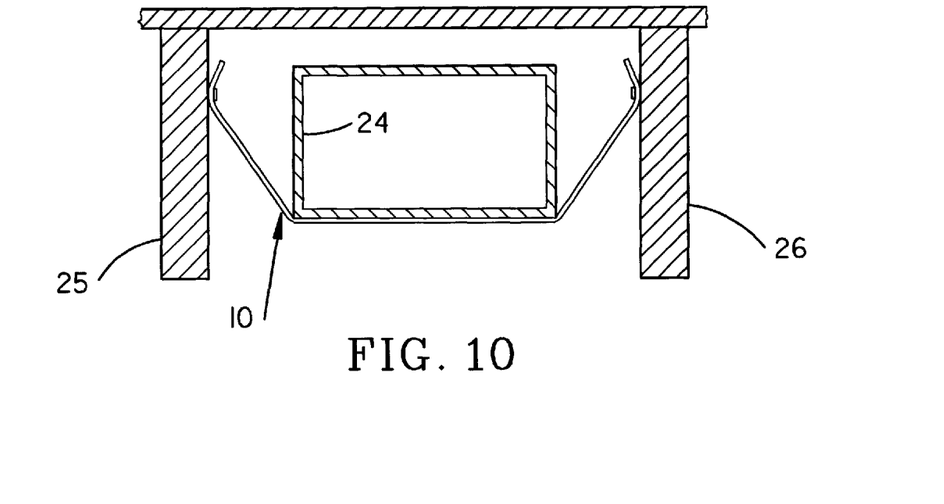
FIG. 10 is a vertical sectional view of the strap supporting a rectangular air-flow duct with the two strap ends secured to juxtaposed floor joists.
Figure 11:
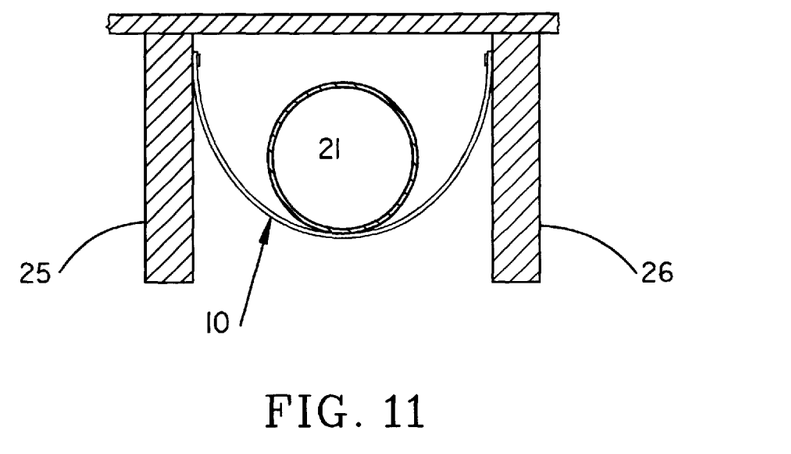
FIG. 11 is a view similar to FIG. 10 with the strap supporting a round duct suspended between floor joists.
Figure 12:
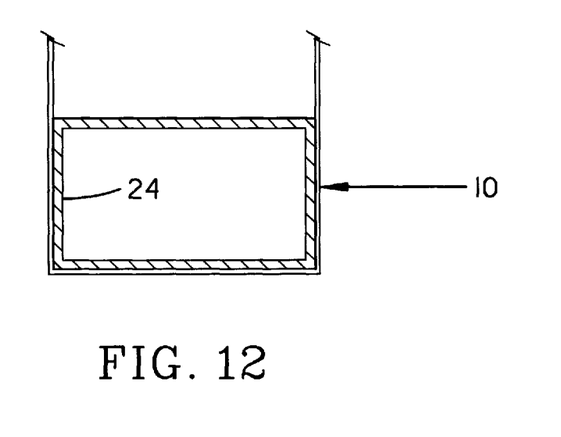
FIG. 12 is a fragmentary perspective view of the strap supporting a rectangular duct suspended from ceiling supports where a dropped ceiling is involved.

FIG. 7 shows a round duct 21 mounted on a single floor joist with both ends of the strap retained by a single nail 18 supporting a localized portion of the duct. FIGS. 8 and 9 show an individual single screw 22 and an individual single nail 18 respectively both having enlarged heads mounted in the floor joists 20 for receiving the apertured strap. FIG. 10 shows a rectangular hollow air duct 24 supported by the strap connected to juxtaposed floor joists 25 and 26 by anils driven into their facing surfaces. FIG. 11 shows a round duct suspended between adjacent floor joists, FIG. 12 shows a rectangular duct suspended from ceiling supports by the strap where a dropped ceiling is involved.

As described hereinabove, the strap being readily flexible and having the grouped sized apertures 12, 13 and 14 permit ready realignment of the strap and duct into proper final relationship with a minimum amount of effort. The enlarged heads of the attachment fasteners may be easily moved into alignment with the larger apertures of the strap and the strap pulled away therefrom. The strap can be relocated and realigned with the fastener head, and then be moved into alignment with one of the smaller apertures of the strap for final seating of the strap in the floor joist or wherever else mounted. Such readjustment is easily accomplished without removal of the fastener element.

Thus, the present invention provides a novel supporting strap for forced-air ducts in a building structure which strap facilitates temporary mounting and realigned final mounting of such ducts as desired or required.

The second embodiment of the support device of the present invention is indicated generally by the numeral 100 in FIGS. 13–19. Device 100 is used to support flexible ducts 102 that easily buckle or kink when supported by conventional thin supports such as wires. Support device 100 provides a broad support cradle that spreads the support force of device 100 over a wide area of duct 102 so that duct 102 will not buckle over device 100.

Figure 13:
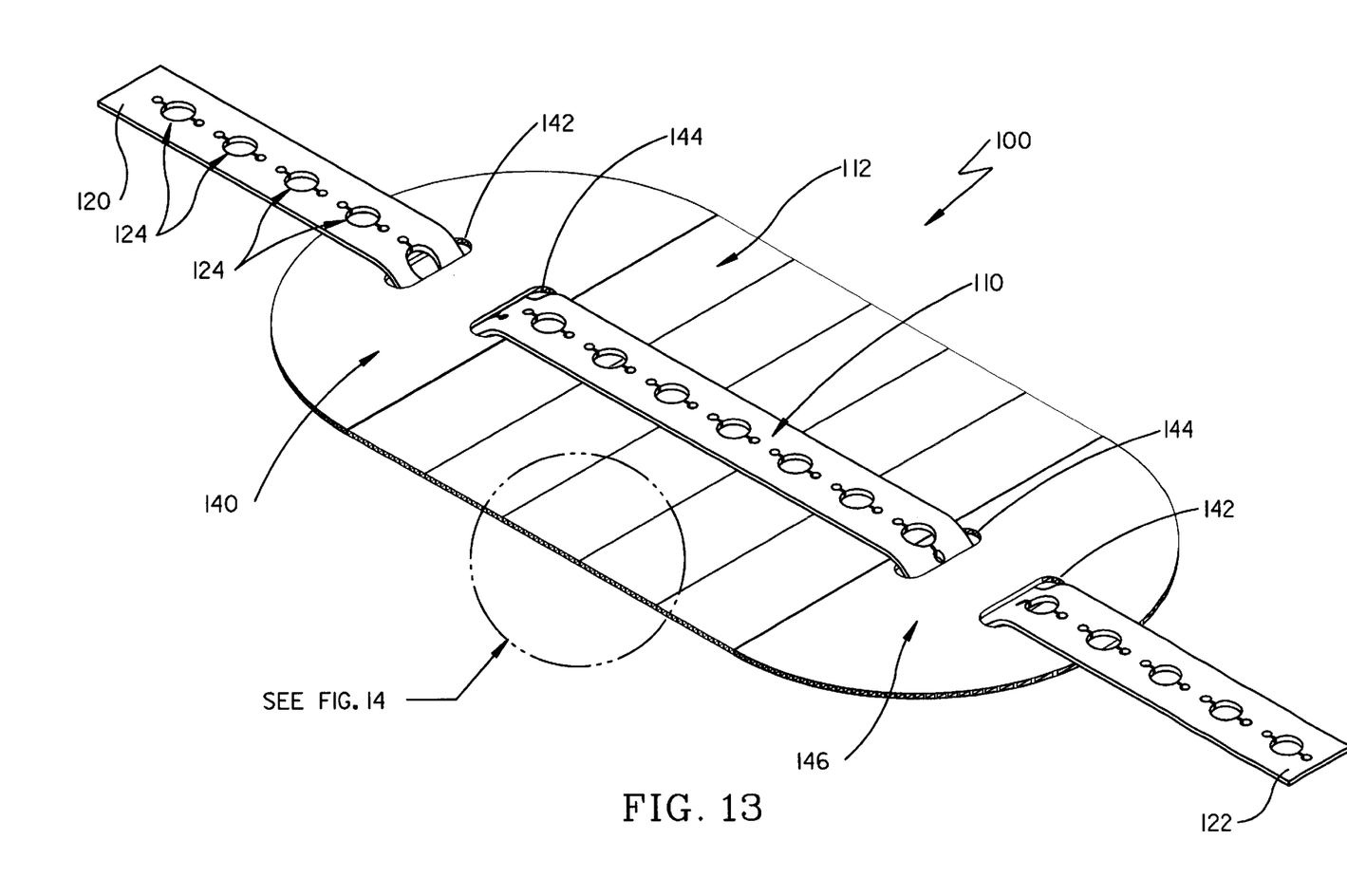
FIG. 13 is a perspective view of the second embodiment of the support device of the invention.

Duct 102 may be a flexible duct that is typically used above drop ceilings in office environments to direct air in HVAC applications. Flexible duct 102 may include an outer wall 104 and an inner wall 106. An insulating material 108 is disposed between walls 104 and 106. Each wall 104 and 106 may function as a vapor barrier to trap or prevent condensation from damaging duct 102. The construction of these ducts allows the ducts to be flexible. Flexible ducts are desired in the art because they are easy to install. However, the flexible ducts can kink or buckle when they are suspended by thin supports. A buckled duct will substantially reduce air flow through the duct.

Device 100 generally includes a strap 110 and a cradle 112. Cradle 112 is slidably carried on strap 110 so that its position may be readily adjusted when a user is hanging a section of duct 102 with device 100. Cradle 112 spreads the supporting force over a large area of duct 102 to prevent duct 102 from buckling.

Strap 110 includes a body with a first end 120 and a second end 122 having a longitudinal length, a thickness, and a latitudinal width. A longitudinal centerline runs between first end 120 and second end 122. Strap 110 may also be fabricated from steel, galvanized steel, aluminum, copper, or other like materials. Strap 110 defines a plurality of opening groups 124 substantially similar to groups 11 described above. Groups 124 allow strap 110 to be connected to a connector such as nail 18/18A (FIG. 9) or screw 22 (FIG. 8).

In another embodiment, strap 110 does not have any openings and the connectors (nails, screws, etc.) must be driven directly through the body of strap 110 to connect strap 110 to a support 130. In another embodiment, strap 110 defines a single opening that is adapted to receive a connector. In another embodiment, strap 110 includes a first opening and a second opening (similar to openings 12 and 13 described above in the first embodiment of the invention) that are connected together by a first slit. These configurations allow strap 110 to be adjustably connected to support 130. Support 130 may be substantially vertical, horizontal, or angled. The configuration of strap 110 allows strap 110 to be connected to the underside 131 of support 130 if desired.

Figure 14:
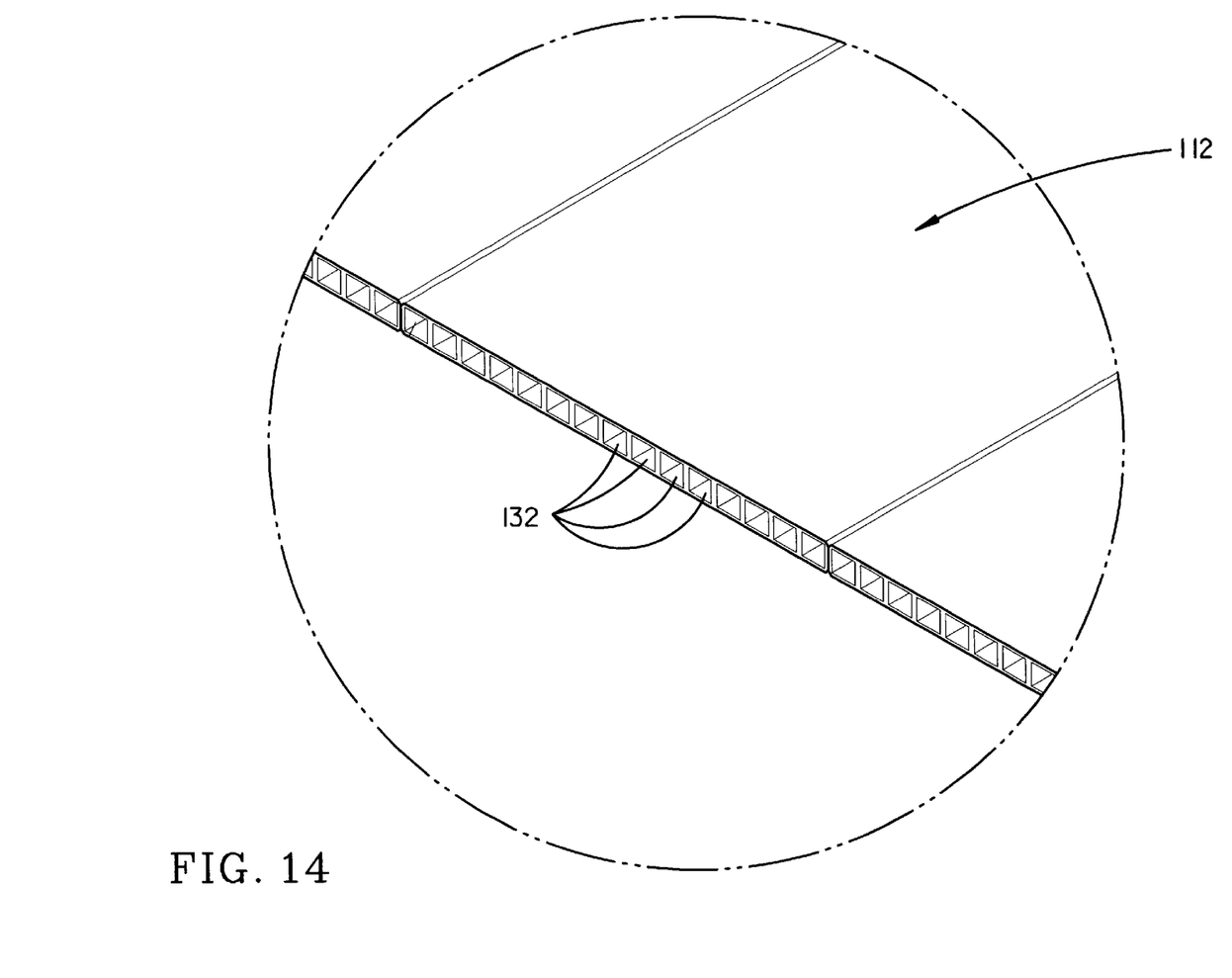
FIG. 14 is a enlarged perspective view of the encircled portion of FIG. 13.
Figure 15:
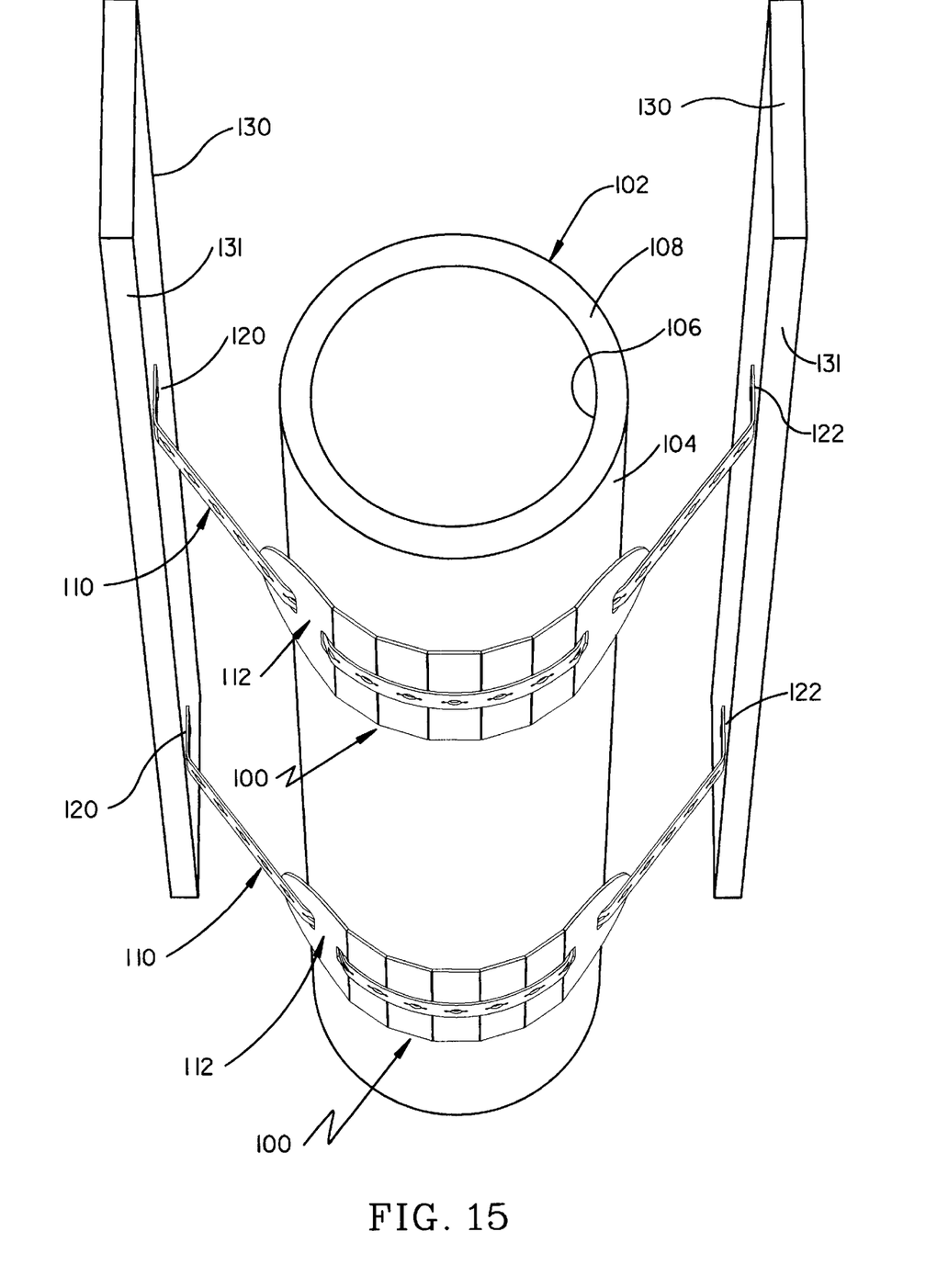
FIG. 15 is a perspective view showing a length of duct being supported by the second embodiment of the invention.

Cradle 112 includes a body having a width and a length. Cradle 112 may be fabricated from any of a variety of materials known in the art. One material is sold under Trademark Registration No. 2,007,048 for THERMOPAN (the structure of which is disclosed in U.S. Pat. No. 5,339,577). Cradle 112 may also be fabricated from steel, galvanized steel, aluminum, copper, or other like materials. Another material includes a corrugated structure. The corrugations of the corrugated structure may extend either parallel with or substantially perpendicular to the centerline of strap 110. When the corrugations run substantially perpendicular to strap 110, cradle 112 may resist bending forces better than when the corrugations run substantially parallel to the centerline of strap 110. A corrugated polymer material may be used to fabricate cradle 110. FIG. 14 shows the individual corrugations 132 disposed substantially perpendicular to the longitudinal centerline of strap 110.

Cradle 112 defines at least a first set 140 of first 142 and second 144 spaced strap openings. Strap 110 is woven through openings 142 an 144 to slidably connect cradle 112 to strap 110. Cradle 112 may include a second set 146 of first and second openings 142 and 144 that provide a second connection between strap 110 and cradle 112. In the embodiment of the invention depicted in FIG. 13, sets 140 and 146 are spaced apart at the ends of the body of cradle 112 and are disposed along the longitudinal centerline of the body of cradle 112.

The width of cradle 112 is substantially larger than the width of strap 110. The width of cradle 112 is at least twice as wide as strap 110 and may be 3, 4, or 5 times as wide as strap 110. The width of cradle 112 allows the support force from device 100 to be spread over a wide area of duct 102. The length of cradle 112 may extend about half of the circumference of duct 102 or at least one-third of the circumference of duct 102. In some embodiments, a cradle having a length of about a fourth of the circumference of duct 102 may function.

Figure 16:
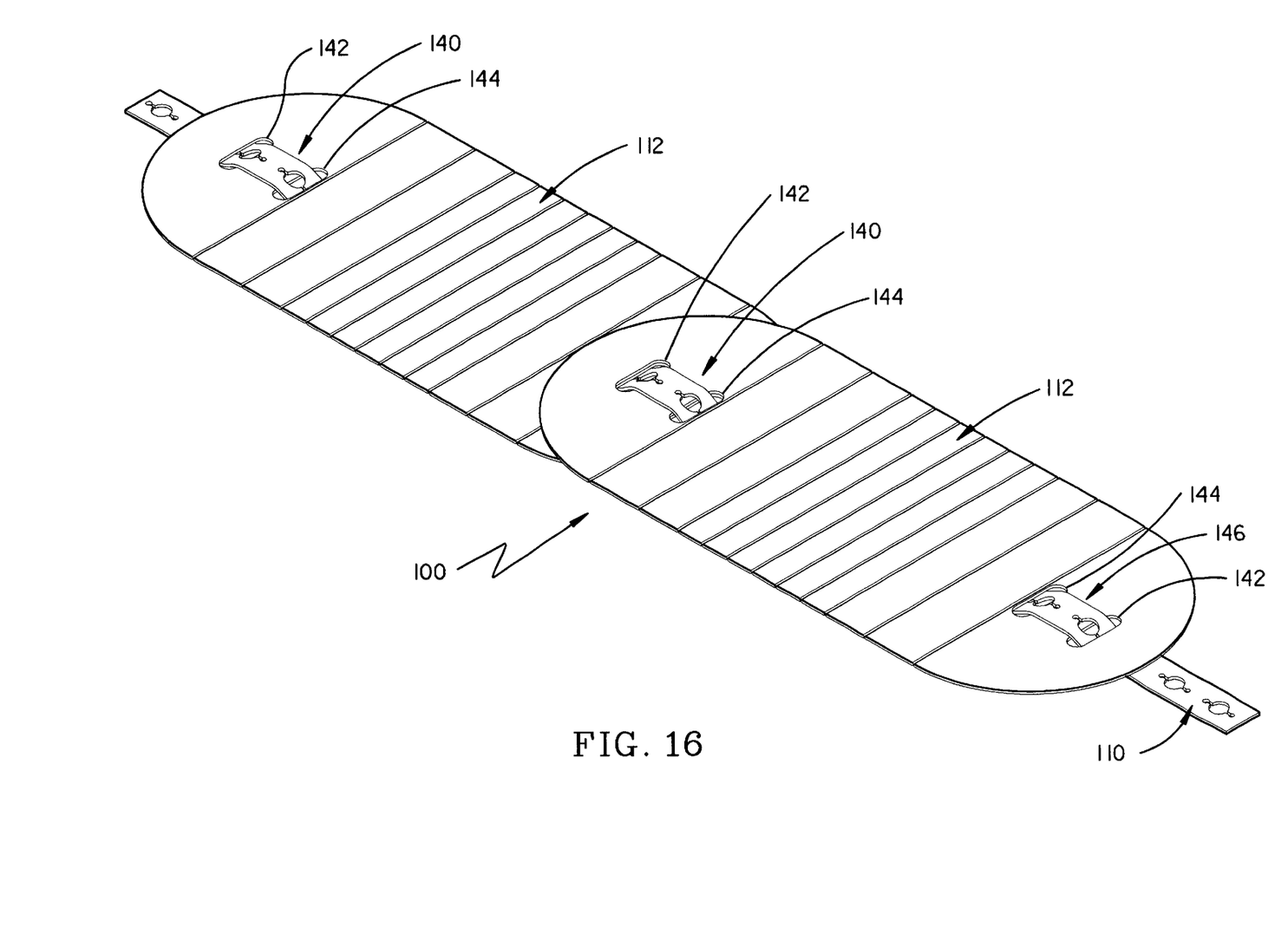
FIG. 16 is a perspective view of two cradles being carried by a single strap.

When the user is installing a duct 102 having a large diameter, the user may wish to install a pair of cradles 112 on a single strap 110 as depicted in FIG. 16. The use of two cradles 112 with a single strap 110 allows the support force of device 100 to be spread over a larger area of duct 102. Two cradles 112 may be attached to strap 110 by first aligning one set of spaced strap openings of one cradle 112 with another set of spaced strap openings on the other cradle. Strap 110 is then woven through the aligned openings to connect strap 110 to both cradles 112. In this configuration, cradles 112 are overlapped. In another configuration, cradles 112 may be disposed end to end or in a spaced configuration with both cradles 112 being carried by strap 110 without overlapping cradles 112.

Figure 17:
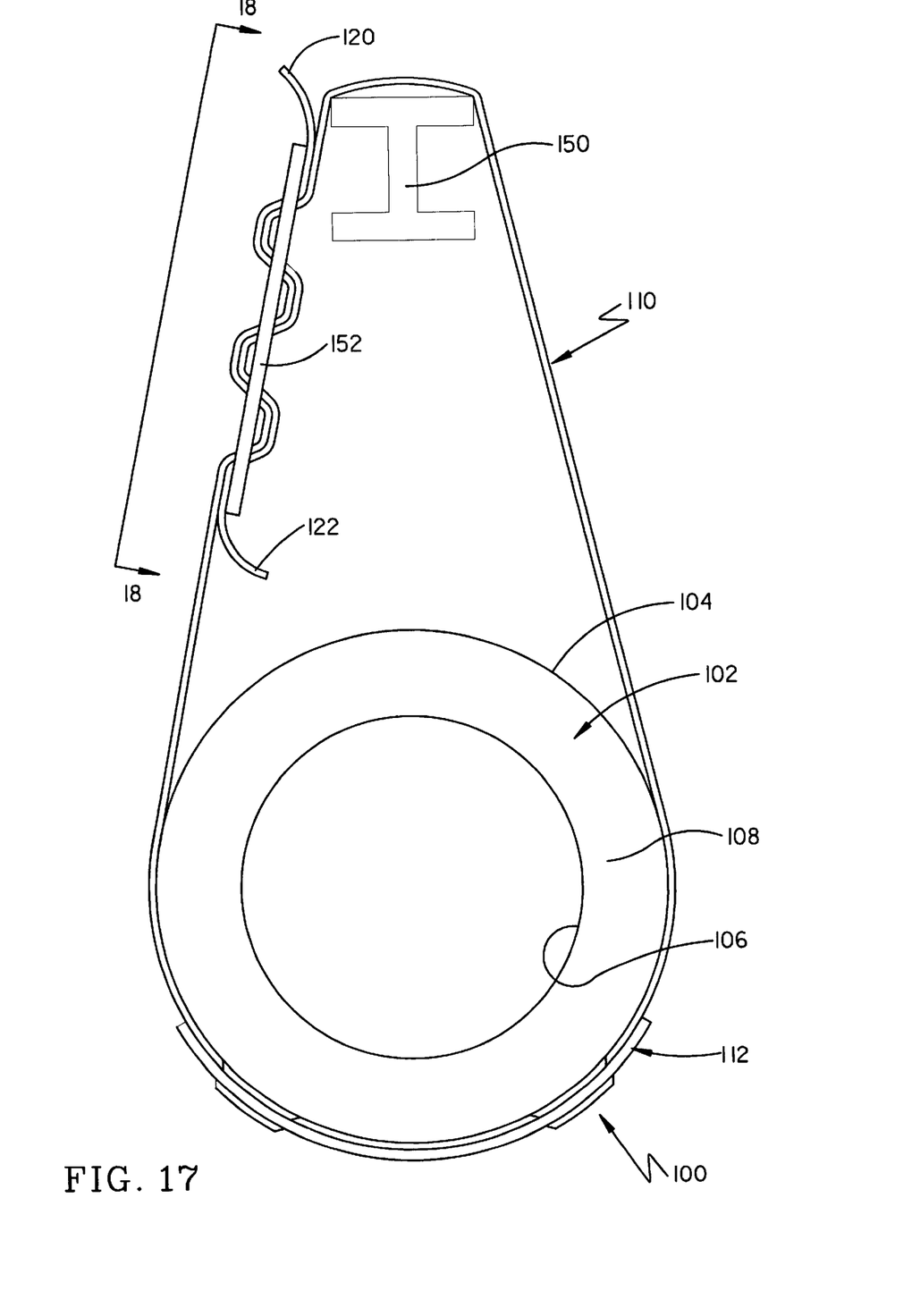
FIG. 17 is an end view of the support device of the invention being supported by a support in an alternative manner.
Figure 18:
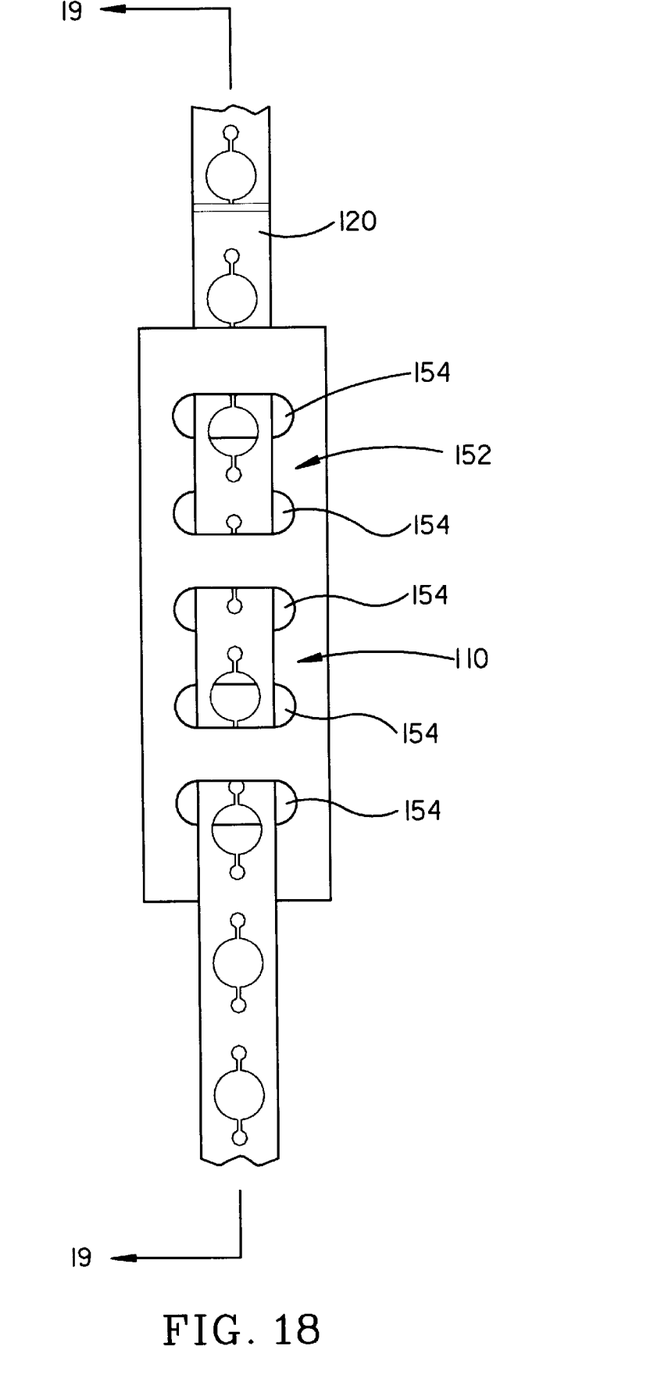
FIG. 18 is a sectional view taken along line 18—18 of FIG. 17.
Figure 19:
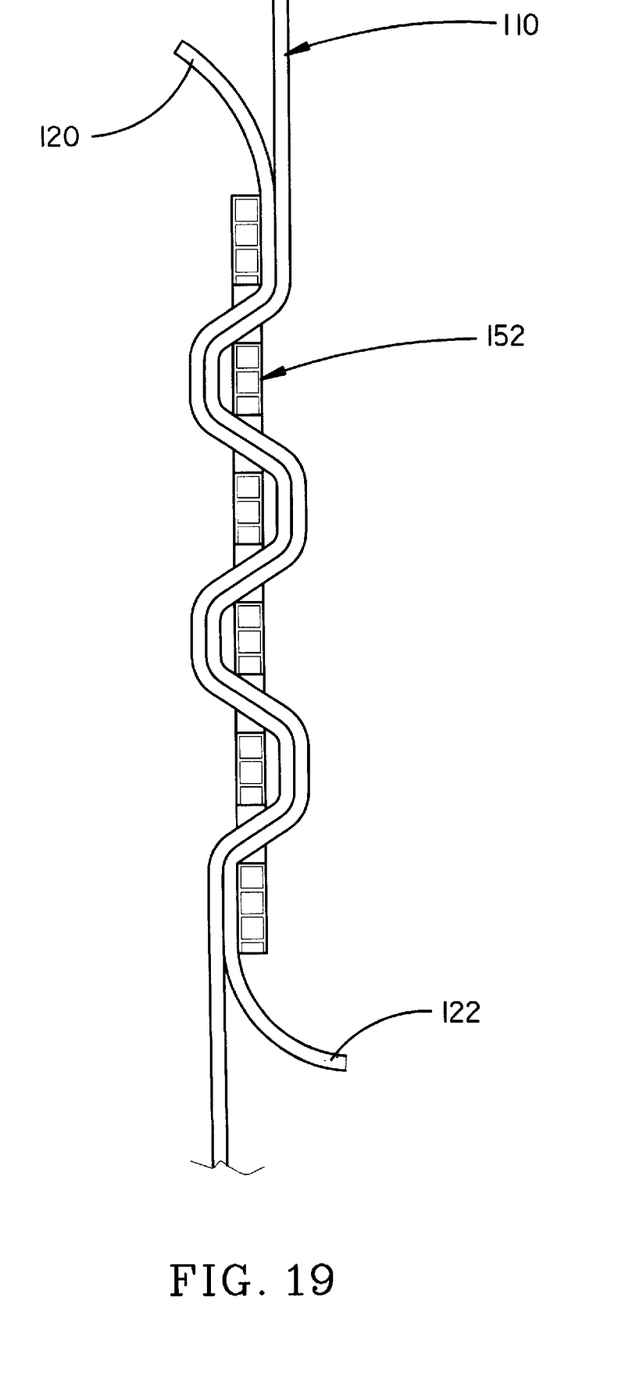
FIG. 19 is a sectional view taken along line 19—19 of FIG. 18.

An alternative mounting configuration as depicted in FIGS. 17–19 where strap 110 is moved over a support 150 and connected back to itself with a buckle 152. Buckle 152 includes a plurality of spaced apart buckle openings 154 through which strap 110 is double woven to connect ends 120 and 122 of strap 110 together. The double weaving of strap ends 120 and 122 through buckle 152 creates a frictional holding force sufficient to support a relatively heavy section of duct 102. In the embodiment of the invention in FIGS. 17–19, five buckle openings 154 are equally spaced along the longitudinal centerline of buckle 152. Buckle 152 may be fabricated from a variety of materials including the corrugated material depicted in FIG. 19. The corrugations run substantially perpendicular to the longitudinal centerline of strap 110.

Buckle 152 allows strap 110 to support duct 102 from supports 150 that do not readily accept a connector such as a nail or a screw. The length of strap 110 is still adjustable by pulling more or pushing less of ends 120 and 122 through buckle 152.

Strap 110, cradle 112, and buckle 152 may be fabricated from a material that does not readily conduct heat and has a desirable insulating value. The elements of device 100 thus do not pull energy out of duct 102. The wide area of cradle 112 presents duct 102 from buckling and does not undesirably compress insulating material 108 at the locations where duct 102 is supported.

Figure 20:
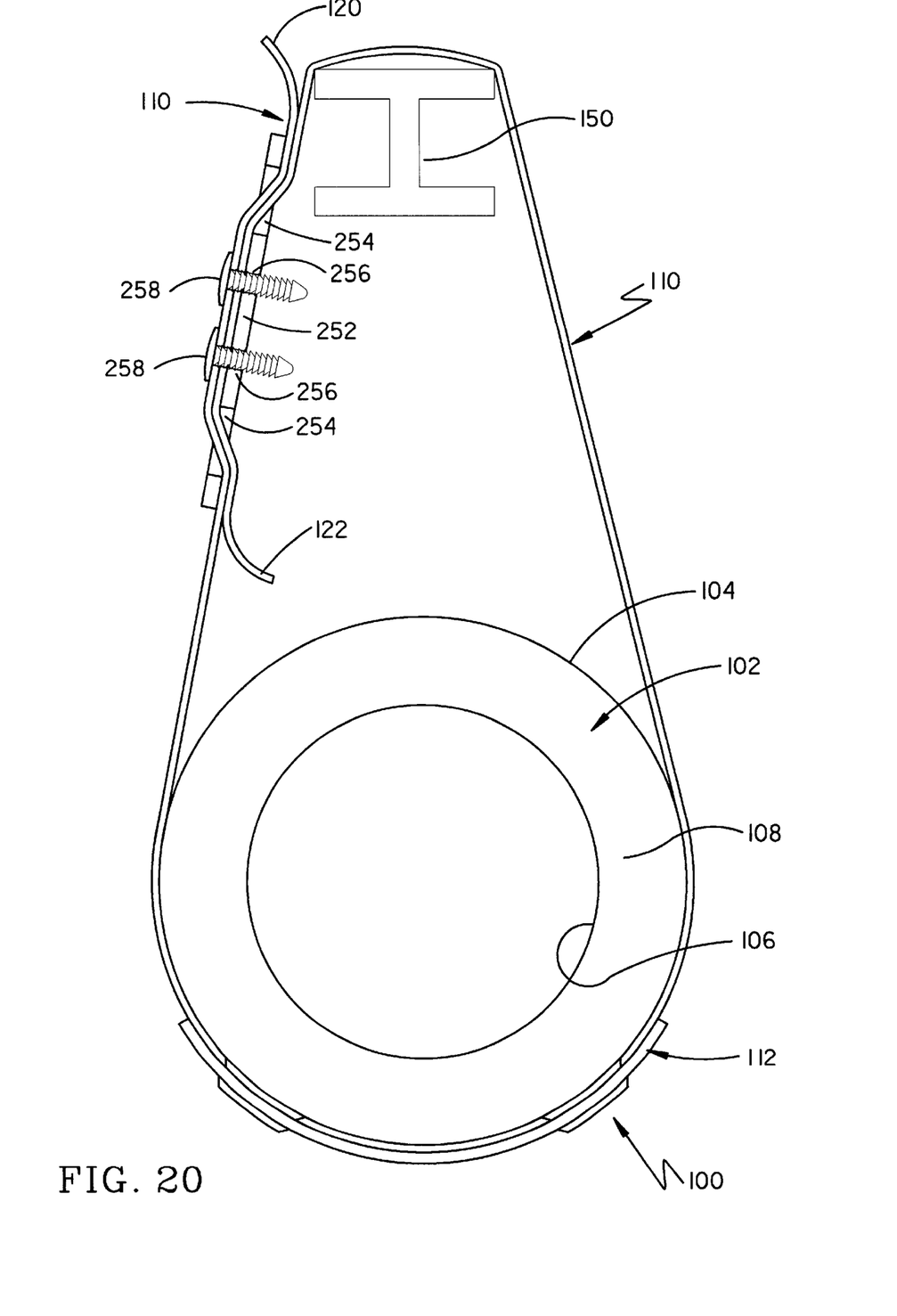
FIG. 20 is an end view similar to FIG. 17 showing an alternative version of the buckle.

FIG. 20 shows an alternative version of the buckle. In this embodiment, strap 110 is mounted over support 150 in a manner similar to that described with respect to FIGS. 17–19. In this embodiment, a buckle 252 is used to hold the ends 120 and 122 together so that strap 110 does not pull out of buckle 252. Buckle 252 includes a pair of spaced apart buckle openings 254 and a pair of lock openings 256 disposed between buckle openings 254.

A pair of locking members 258 are pushed through both strap ends 120 and 122 and through buckle 252 to lock the position of strap 110 with respect to buckle 252. Each locking member 258 includes a plurality of barbs that catch on buckle 252 to prevent locking member 258 from being removed from buckle 252. Each locking member 258 is configured to fit through opening 12 in strap 110.

Buckle 252 may be used to frictionally hold the relative positions of ends 120 and 122 while duct 102 is being positioned. Once duct 102 is properly positioned and strap 110 is properly adjusted, the user inserts locking members 258 through ends 120 and 122 to lock the position of strap 110 with respect to buckle 252.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention are by way of example, and the scope of the invention is not limited to the exact details shown or described.

Various modifications may be resorted to within the spirit and scope of the appended claims.

What is claimed is:

1. A device for supporting a duct, the duct having a diameter; the device comprising:

a strap having a first end, a second end, and a longitudinal centerline extending between the first and second ends;

the strap having a width and a thickness; the width of the strap being substantially larger than the thickness of the strap; the strap having a rectangular cross section;

first and second cradles; each cradle having a width and a length;

the width of each cradle being at least twice the width of the strap;

each cradle having a thin body fabricated from a corrugated material;

the first and second cradles being slidably carried by the strap and adapted to engage and support the duct;

each cradle defining first and second sets of spaced openings;

the first and second cradles being overlapped such that one set of spaced openings from each cradle are aligned to define a total of three sets of spaced openings; and the strap being woven through the three sets of spaced openings to connect the first and second cradles to the strap.

2. The device of claim 1, wherein the width of each cradle is at least three times the width of the strap.

3. The device of claim 1, wherein the width of the strap is constant along its length.

4. The device of claim 1, wherein the first set of spaced openings is disposed on the longitudinal centerline of the first cradle.

5. The device of claim 1, wherein the corrugations are substantially perpendicular to the centerline of the strap.

6. The device of claim 1, wherein the corrugations are substantially parallel to the centerline of the strap.

7. The device of claim 1, wherein each cradle is fabricated from a corrugated polymer.

* * * * *